Nov. 26, 1968  W. TAUSCH ET AL  3,412,716
FUEL-SUPPLY CONTROL SYSTEM FOR ROTARY-PISTON
INTERNAL COMBUSTION ENGINES
Filed Dec. 6, 1966

INVENTORS
WINFRIED TAUSCH
WERNER WOLF

United States Patent Office 3,412,716
Patented Nov. 26, 1968

3,412,716
FUEL-SUPPLY CONTROL SYSTEM FOR ROTARY-PISTON INTERNAL COMBUSTION ENGINES
Winfried Tausch, Zwickau, and Werner Wolf, Wilkau-Hasslau, Saxony, Germany, assignors to Veb Sachsenring Automobilwerke Zwickau, Zwickau, Germany
Filed Dec. 6, 1966, Ser. No. 599,424
6 Claims. (Cl. 123—8)

ABSTRACT OF THE DISCLOSURE

Controls for rotary-piston internal combustion engines. A piston of the engine rotates in a housing thereof which is provided with peripheral and lateral passages communicating with the combustion chamber. A pair of valve means respectively coact with these passages, and a control means is connected to the pair of valve means to control the later depending upon the speed of rotation of the piston and the load on the engine. This control means is operatively connected with the pair of valve means to provide for closing movement of one of the valve means while simultaneously providing opening movement of the other of the valve means, so that the pair of valve means are activated in opposition to each other.

---

The invention relates to a rotary-piston type of internal combustion engine.

In particular, the invention relates to a system for supplying a combustible mixture into the combustion chambers of an engine of this type.

As is well known, such rotary piston engines include a rotary piston having a plurality of corners uniformly distributed about the piston axis, the piston having a configuration similar to that of an equilateral triangle provided with outwardly bulging convex sides. The piston is operatively connected with an eccentric shaft so as to rotate the latter, and the corners or outer tips of the piston ride along an inner peripheral surface of an engine housing in which the piston is located, this inner peripheral surface which is slidably and fluid-tightly engaged by the corners of the piston having the configuration of a trochoid. The piston not only has fluid-tight sliding engagement with the inner peripheral housing surface which is of trochoid configuration but also has a slidable fluid-tight engagement with the inner side surfaces of the housing, and as the piston rotates in the housing it defines with the interior thereof combustion chambers the volume of which continuously changes during rotation of the piston in the housing.

A combustible mixture is introduced into these combustion chambers through passages formed in the peripheral and transverse walls of the housing. The flow of the combustible mixture through these passages into the combustion chamber is controlled through suitable valves such as suitable throttle valves, so that in this way the operation of the engine is controlled.

It is known to introduce the combustible mixture into combustion chambers either through a peripheral housing inlet or through one or more lateral housing inlets. Where a peripheral inlet for the fuel-air mixture is provided, there is a disadvantage in that the extent to which the inlet and outlet openings for the combustion chambers overlap can be reduced only down to a given minimum, with the result that during operation at low loads and at low speeds, the combustible mixture drawn into the combustion chambers is unavoidably thinned by the previously ignited gases, so that an unstable operation of the engine at low efficiency results.

When lateral inlets are used for the combustible charge, the control timing can be made more favorable but since the eccentric movement of the piston makes it impossible to provide inner and outer seals for the piston, the cross-section of the inlet opening cannot be made sufficiently large, so that there is the disadvantage that during operation at higher engine speeds, in the region of the top speed thereof, the charging of the combustion chambers with the combustible mixture is inadequate and the output of the engine is too low.

It has, therefore, been proposed to provide for engines of this type an additional inlet for the combustible mixture, this additional inlet being designed for use during partial load operation and having an inlet opening arranged in a side or transverse wall of the housing in such a way that this additional inlet is only uncovered by the piston when the discharge opening of the combustion chamber is closed. The two-phase carburetor of such an engine opens the primary fuel inlet passage only at and beyond 30% of full load operation, and this primary fuel inlet is closed in region of the inlet to the combustion chamber by a suitable throttle valve so that the dead-space loss during partial load operation will be maintained low. Unnecessary circulation of fluid in empty spaces will result in losses which are avoided in this way.

Furthermore, it has been proposed to combine the peripheral and lateral inlets in such a way that a two-phase carburetor has its first stage connected with the lateral inlet for partial load operation and its second stage connected with the peripheral inlet for full load operation. While the first stage for partial load operation actuates a throttle valve in response to actuation of an accelerator pedal, so as to close the lateral inlet for partial load operation, the second stage is closed by a throttle valve, situated just in front of the fuel inlet opening to the combustion chamber, in response to the vacuum controlled by the first stage. In this way it is only at high speeds and at large loads that the second stage becomes operative due to the increased vacuum of the first stage.

A similar proposal has been provided for the fuel-supply system of a multiple-piston engine of the above type having a two-phase carburetor the first stage of which is connected to the lateral inlets and the second stage through peripheral inlets separate to the individual rotary pistons.

All of the above attempts to solve the problem require for the delivery of the combustible mixture to the combustion chambers a two-phase carburetor or even a special carburetor which must be designed for the particular engines. The controls are provided in dependence upon the load so that it can happen, for example, that at full load, while the engine operates at low speed, the peripheral fuel inlet is fully opened and the mixture drawn into the combustion chamber is thined by the previously ignited gasses, so that the extent to which the combustion chambers are filled with the combustible mixture is reduced and the output drops. The lateral inlets for partial load operations do not operate properly because the earlier opening peripheral inlet fills the combustion chamber and in the lateral inlet there is a higher resistance to flow of the fluid. As a result of these faults, the fuel consumption of the engine is increased, and the torque provided at the lower speed ranges is unsatisfactory.

It is thus a primary object of the present invention to avoid the above drawbacks of the known solutions to the problem.

Thus, it is an object of the invention to provide, for a rotary piston type of internal combustion engine, a fuel supply system capable of producing a favorable torque throughout the entire speed range of the engine.

Also, it is an object of the present invention to provide a fuel supply system, for a rotary piston type of internal combustion engine, which will have a highly favorable fuel consumption both at full load operation and at partial load operation.

In addition, it is an object of the present invention to provide, for an engine of the above type, a structure capable of accomplishing the above objects while using a simple, conventional single-stage carburetor, so that the expensive complications involved in the use of a special carburetor construction are avoided with the present invention.

Thus, in accordance with the present invention, the housing in which the piston rotates has peripheral and transverse walls respectively formed with peripheral and lateral fuel inlets, and a pair of valve means respectively coact with these inlets for controlling the flow of fuel therethrough. A control means of the invention is operatively connected with the pair of valve means for controlling the latter in dependence upon the speed of rotation of the engine and the load on the engine, and the control means will provide opening movement of one valve means while closing the other valve means, so that in this way the pair of valve means are actuated in opposition to each other with the control means of the invention. The control means of the invention also is adjustable so that the extent to which the controls are influenced by the speed of rotation of the engine and by the load thereon can be regulated. In this way it is possible to achieve with the invention an optimum adjustment for the fuel supply system so as to provide the best possible fuel consumption and a maximum turning moment throughout the entire range of operating speeds of the engine.

In accordance with a further feature of the invention, the pair of valve means are in the form of throttle valves situated directly in the fuel inlet passages adjacent to the interior of the engine housing, so that the dead space in the passages extending from the valves to the interior of the housing is maintained at a minimum to reduce fuel circulation losses to a minimum.

The invention is illustrated by way of example by the accompanying drawings which form part of this application and in which.

Figure 1:
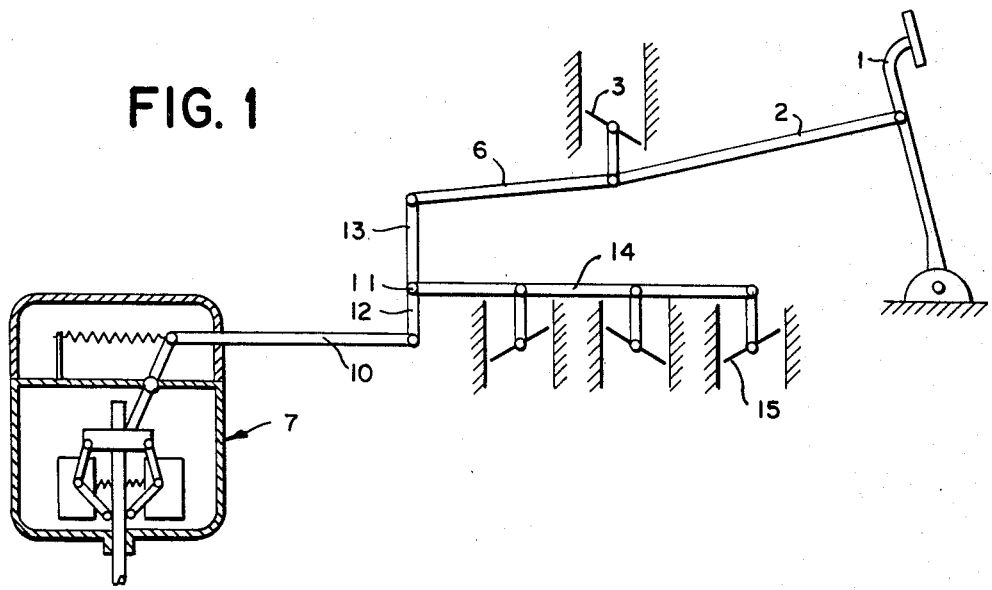
FIG. 1 is a schematic illustration of the control system of the invention.

Referring to FIG. 1, it will be seen that there is available to the operator an accelerator pedal 1 which actuates an elongated carburetor link 2. When the link 2 moves in response to turning of the pedal 1 by the operator, the throttle valve 3 of the carburetor 4 is actuated, this carburetor 4 communicating with and being connected to an intake manifold 5 through which the combustible mixture is sucked into the engine.

A centrifugal governor 7 is driven by a drive shaft 8 which is in turn driven from the crank shaft 9 of the engine. This governor controls the movement of a governor link 10 which, as schematically shown in FIG. 1, will be shifted to the right and left as viewed in FIG. 1, in response to movement of the governor as the speed of the engine changes. Thus, during a decrease in the speed of the engine, the governor link 10 will be shifted to the right, as viewed in FIG. 1, and during an increase in the speed of the engine, the governor link 10 will be shifted to the left, as viewed in FIG. 1.

The control means of the invention includes not only the carburetor link 2 and the governor link 10, but also a control lever 11 which is pivotally connected at its opposite ends respectively to the links 2 and 10 so that during movement of the link 2 the lever 11 is turned about its pivotal connection to the link 10 and during movement of the link 10 the lever 11 is turned about its pivotal connection to the link 2. In this way the angular position of the lever 11 is determined by the positions taken by the links 2 and 10 at any given instant.

A valve actuating rod 14 is pivotally connected with the lever 11 intermediate the ends thereof for transmitting the turning movement of the lever 11 to control valves situated in the inlet passages to the combustion chambers. Thus, the pivotal connection of the valve control rod 14 to the lever 11 intermediate the ends thereof divides the lever 11 into a pair of lever arms 12 and 13. The lever 11 may, for example, have a plurality of openings distributed along its length, and the pivot pin for connecting the rod 14 to the lever 11 can be selectively situated in one of these openings so that in this way the relationship between the lengths of the arms 12 and 13 of the lever 11 can be adjusted, so as to control the extent to which the rotary speed of the engine and the load on the engine influence the positions of the fuel inlet valves.

Figure 2:
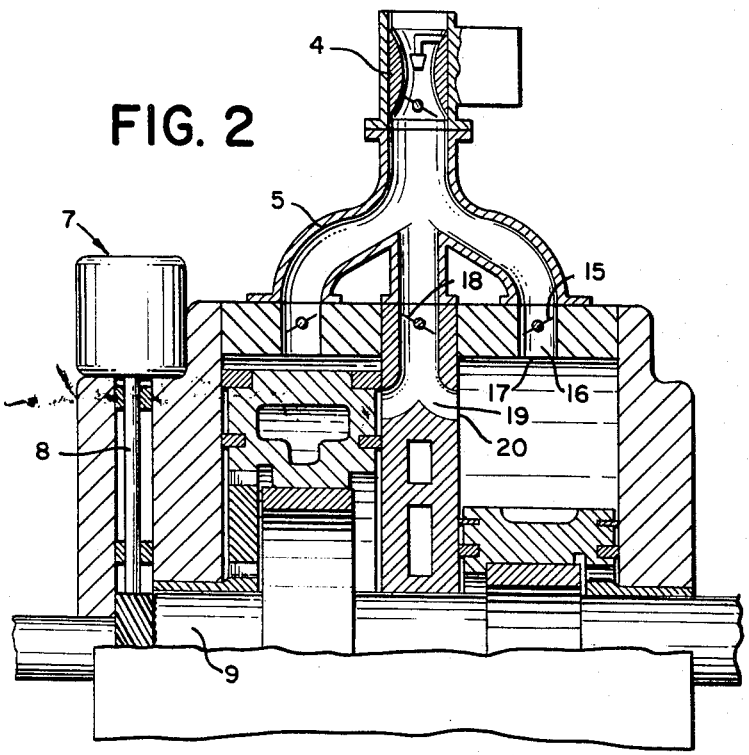
FIG. 2 is a schematic partly sectional elevation of an engine according to the invention, the sectional part of FIG. 2 being taken in a plane which contains the axis of the eccentric shaft.

In the particular example illustrated in the drawings, there are a pair of rotary pistons turnable in the engine housing, the engine housing having an intermediate transverse wall situated between and separating the chambers in which the pair of rotary pistons are located. The housing has a peripheral wall formed with the peripheral fuel inlets 16 which cooperate with the manifold 5 as indicated in FIG. 2, and within these openings 16 are situated a pair of valve means 15 in the form of tiltable throttle valves.

The intermediate transverse wall is formed with a passage 19 providing lateral inlets to the pair of chambers in which the pistons respectively rotate, and within the lateral inlet 19 is situated a throttle valve 18 which forms a second valve means coacting in this case with the lateral inlet of the housing. This second valve means 18 is also controlled by the rod 14.

As is apparent from FIG. 1, the valves 15, on the one hand, and the valve 18, on the other hand, are actuated in opposition to each other since movement of the rod 14 to open one of these valves to an increasing degree will result in closing of the other to an increasing degree, and vice versa. Thus, as may be seen from FIG. 1, as the pair of valves 15 are increasingly opened during movement of the rod 14 to the left, as viewed in FIG. 1, the valve 18 is increasingly closed, while when the latter is increasingly opened the pair of valves 15 are increasingly closed. Thus, with this construction the fuel-air mixture flowing through the carburetor and along the interior of the intake manifold 5 will pass through the passages 16 and 19 as determined by the positions of the valve means 15 and 18 which coact therewith.

The peripheral inlet passages 16 have inner ends 17 situated directly next to the interior of the housing, and it will be noted that the valves 15 are situated directly in the passages 16 adjacent to their inner ends 17 so that in this way the circulating losses are reduced to a minimum. In the same way, the valve 18 is situated directly in the passage 19 adjacent to the inlet ends 20 thereof so as also to reduce the circulation losses at the lateral inlets to the combustion chambers formed by the passage 19.

During starting operations and during idling of the engine, the valve 18 for the lateral inlets is fully opened, since at this time the governor 7 responds to the low speed operation of the engine and displaces the link 10 all the way up to the region of its right end position, as viewed in FIG. 1, thus turning the lever 11 in a counterclockwise direction about its connection to the link 2 so as to shift the rod 14 to the right, as viewed in FIG. 1, and fully open the valve 18 while fully closing the valves 15. As the operator depresses the accelerator pedal 1, and the speed of rotation of the engine increases, the rod 14 will necessarily be shifted to the left, as viewed in FIG. 1, resulting in closing movement of the valve 18 and opening movement of the valves 15, the valve 18 becoming closed so as to close the lateral fuel inlets while the valves 15 for the peripheral inlets are controlled in such a way, in accordance with the load and speed of the engine, that at full load and at maximum speed these valves 15 for the peripheral fuel inlets are fully opened. When the operator removes his foot from the pedal 1 so that the latter is retracted, the lateral fuel inlets 20 will open in correspondence with the lower load and with the drop in speed of the engine, and the peripheral inlets 16 will become closed. During full load operation at the lower operating speeds of the engine the control lever 11 assumes a position where, in spite of the influence of the accelerator pedal 1, the lateral fuel inlets 20 are opened as result of the control derived for the valve 18 from the governor 7, and at this time the peripheral inlets 16 are partially closed, so that the manner in which the combustion chambers are filled with the combustible charge is improved and a better torque is achieved.

What is claimed is:

1. In a rotary-piston internal combustion engine, a housing having a hollow interior and having peripheral and transverse walls respectively formed with peripheral and lateral passages extending therethrough for admitting a combustible mixture into the interior of said housing, a rotary piston situated in said housing and rotating therein to form with the interior of said housing combustion chambers the volume of which changes during rotation of said piston in said housing, and said combustion chambers communicating with said passages for receiving a combustible mixture therefrom, a pair of valve means respectively coacting with said passages for opening and closing the latter to given degrees depending upon positions of said pair of valve means, and control means operatively connected to said pair of valve means for controlling the latter, depending upon the speed of rotation of said piston and the load on the engine, said control means being operatively connected with said pair of valve means for providing closing movement of one of said valve means while simultaneously providing opening movement of the other of the valve means so that said pair of valve means are actuated in opposition to each other by said control means.

2. The combination of claim 1 and wherein a single-stage carburetor means communicates with said passages for supplying a combustible mixture thereto.

3. The combination of claim 1 and wherein said control means is adjustable for changing the extent to which the speed of rotation and the load influence the positions of said pair of valve means through said control means.

4. The combination of claim 1 and wherein said passages respectively have ends situated directly next to the interior of said housing and said pair of valve means being respectively situated in said passages adjacent to said ends thereof.

5. The combination of claim 1 and wherein a governor is driven by the engine and an accelerator pedal is available to the operator for controlling a carburetor through which a combustible mixture is delivered to said passages for entry therethrough into the interior of said housing, said control means including a pair of links respectively connected operatively with said accelerator pedal and with said governor for respectively moving in opposite directions when said accelerator pedal is depressed and when said governor slows down in response to a drop in the speed of the engine, a lever extending between and pivotally connected at opposed ends to said links, so that during movement of one link with respect to the other said lever is turned about its pivotal connection to said other link, and an elongated rod pivotally connected with said lever intermediate the ends thereof and operatively connected with said pair of valve means for actuating the latter according to the angular position of said lever as determined by said pair of links, said accelerator pedal acting through the link connected thereto and said lever on said control rod for providing opening movement of the valve means which coacts with the peripheral passage while simultaneously providing closing movement of the valve means which coacts with said lateral passage, as said accelerator pedal is depressed by the operator, and said governor acting through the link connected thereto on said lever for providing closing movement of the valve means which coacts with said lateral passage when said governor responds to a drop in the speed of the engine.

6. The combination of claim 1 and wherein a governor is driven by the engine and an accelerator pedal is available to the operator for controlling a carburetor through which a combustible mixture is delivered to said passages for entry therethrough into the interior of said housing, said control means being operatively connected with said governor for controlling said pair of valve means according to the speed of rotation of the piston and to said accelerator pedal for controlling said pair of valve means according to the load on the engine.

References Cited

UNITED STATES PATENTS 3,077,867   2/1963   Froede.

FOREIGN PATENTS 1,007,193   10/1965   Great Britain.

RALPH D. BLAKESLEE, *Primary Examiner.*